United States Patent
Lehmann et al.

(10) Patent No.: US 6,685,818 B2
(45) Date of Patent: Feb. 3, 2004

(54) PROCESS FOR THE ELECTROCHEMICAL PREPARATION OF HYDROGEN PEROXIDE

(75) Inventors: Thomas Lehmann, Langenselbold (DE); Patrik Stenner, Hanau (DE)

(73) Assignee: Degussa AG, Düsseldorf (DE)

( * ) Notice: Subject to any disclaimer, the term of this patent is extended or adjusted under 35 U.S.C. 154(b) by 39 days.

(21) Appl. No.: 09/961,401

(22) Filed: Sep. 25, 2001

(65) Prior Publication Data

US 2002/0036147 A1 Mar. 28, 2002

(30) Foreign Application Priority Data

Sep. 26, 2000 (DE) .......................... 100 48 030

(51) Int. Cl.[7] .............................. C01B 15/01
(52) U.S. Cl. .................... 205/343; 205/466; 205/468
(58) Field of Search ................ 205/466, 468, 205/343

(56) References Cited

U.S. PATENT DOCUMENTS 5,800,796 A * 9/1998 Webb et al. .............. 205/466

FOREIGN PATENT DOCUMENTS

| DE | 19516304 C1 | 7/1996 |
|---|---|---|
| WO | WO 97 13006 A | 4/1997 |

OTHER PUBLICATIONS

Steven P. Webb, et al., "Generation of Hydrogen Peroxide in a Shorted Fuel Cell," The Electrochemical Society Proceedings vol. 95–26, pp. 198–208, (no date).

Pallav Tatapudi, et al., "Simultaneous Synthesis of Ozone and Hydrogen Peroxide in a Proton–Exchange–Membrane Electrochemical Reactor," J. Electrochem. Soc., vol. 141, No. 5, May 1994, pp. 1174–1178.

P.C. Foller, et al., "Processes for the production of mixtures of caustic soda and hydrogen peroxide via the reduction of oxygen," Journal of Applied Electrochemistry vol. 25, 1995, pp. 613–627.

PCT Notification of Transmittal of International Search Report (PCT/ISA/220) and PCT International Search Report dated Feb. 21, 2002 (Form PCT/ISA/210) (both in German).

* cited by examiner

Primary Examiner—Arun S. Phasge
(74) Attorney, Agent, or Firm—Smith, Gambrell & Russell, LLP

(57) ABSTRACT

A process for the electrochemical preparation of hydrogen peroxide, in particular an aqueous hydrogen peroxide solution, by the electrochemical reaction of oxygen and hydrogen in a fuel cell. By increasing the thickness of the membrane layer in a membrane electrode unit (MEU) in the fuel cell, it is possible to substantially increase the concentration of $H_2O_2$ in the aqueous hydrogen peroxide solution obtained at the cathode.

10 Claims, 2 Drawing Sheets

PROCESS FOR THE ELECTROCHEMICAL PREPARATION OF HYDROGEN PEROXIDE

INTRODUCTION AND BACKGROUND

The present invention provides a process for the electrochemical preparation of hydrogen peroxide in an electrolysis cell the structure of which is substantially analogous to that of a fuel cell.

It is known that hydrogen peroxide can be prepared by the so-called anthraquinone cyclic process. This large-scale industrially applied process has the disadvantages, on the one hand, that the hydrogen peroxide produced has to be concentrated to a concentration in the region of mostly 50 to 70 wt. % and, on the other hand, that the transport of such solutions to the site of use is costly. Since in any case, in many fields of use of hydrogen peroxide, only dilute solutions are used, there is a keen interest in preparing hydrogen peroxide on site. At the same time, in many applications there is an interest in preparing hydrogen peroxide on demand and using it immediately, without the need for a device to store highly concentrated hydrogen peroxide.

In order to make hydrogen peroxide available on site and on demand, electrochemical processes are receiving renewed interest. Most of the currently known processes are based on the cathodic reduction of oxygen and the use of an alkali metal hydroxide as the electrolyte. Alkaline hydrogen peroxide solutions are obtained, wherein the molar ratio of, for example, NaOH to hydrogen peroxide is in the range 2.3 to 1 to about 1 to 1. A review of currently known processes is provided by P. C. Foller and R. T. Bombard in Journal of Applied Electrochemistry 25 (1995), 613–627. The Dow Chemical Co., for example, operates a trickle bed cell with a trickle bed located at the cathode, wherein the particles in the trickle bed consist of graphite particles with a coating of polytetrafluoroethylene and carbon black. This process operates at room temperature and atmospheric pressure and the catholyte flow is controlled by the anolyte via a diaphragm. Platinized titanium is used as the anode. A molar solution of caustic soda is used as the electrolyte. The disadvantage of this process is that it can be run only at low current densities, which means that the investment costs for this type of plant are high. The current efficiency decreases greatly as the current density increases.

Electrochemical processes in which alkaline hydrogen peroxide can be prepared by using flat cathodes in membrane-partitioned electrolysis cells are also known, wherein the membrane is a perfluorinated sulfonic acid membrane.

In another process, electrolysis takes place in an electrolysis cell, wherein the cathode is designed as an oxygen diffusion electrode and the anode is designed as an oxygen-evolving metal electrode or as a hydrogen diffusion electrode. The catholyte in this process is water and the anolyte is a solution of sodium sulfate in sulfuric acid; the reaction product is an alkaline hydrogen peroxide solution—see DE 195 16 304.

A critical disadvantage of the processes described above is the concentration of alkali metal in the alkaline hydrogen peroxide produced. This alkali metal concentration is undesirable for many applications and in addition reduces the stability of hydrogen peroxide. P. Tatapudi and J. M. Fenton, in J. Electrochem. Soc. Vol. 141, No. 5, (1994), 1174–1178, disclose a process for the simultaneous synthesis of ozone and hydrogen peroxide in an electrochemical reactor which contains a proton exchange membrane. Ozone is produced at the anode with a current efficiency of 4.5% and hydrogen peroxide is produced at the cathode with a current efficiency of 0.8%. The latter was obtained in a concentration in the range 3 to 5 mg/l. The result mentioned was obtained in a continuous flow reactor with a cation exchange membrane (Nafion® 117 from DuPont); the cathode consisted substantially of activated carbon, graphite and gold powder and contained polymeric tetrafluoroethylene as binder; the anode contained lead dioxide as the catalytically active material. The disadvantages of this process are, on the one hand, the very low current efficiencies and also the production of ozone in addition to hydrogen peroxide. The document gives no indication as to measures which might be used to significantly increase the current efficiency and the $H_2O_2$ concentration in order to make the process more acceptable on an industrial scale.

As can be seen in the publication by Steven P. Webb and James A. McIntyre in The Electrochemical Society Proceedings, Vol. 95–26, 198–208, alkali metal-free hydrogen peroxide can be produced via an electrochemical route by using a fuel cell as an electrolysis cell. A cell of this type contains a membrane electrode unit (MEU), also called a membrane electrode assembly (MEA), which contains a membrane based on a sulfonic acid group-containing perfluorinated polymer or copolymer, one face of which makes direct contact with an anode layer and the opposite face of which makes direct contact with a cathode layer. A diffuser layer (backing) made from a carbon-containing two-dimensional material is arranged on the electrode layers. The electrocatalytically active anode layer contains a binder based on a perfluorinated polymer or copolymer and a catalytically active component which in this case preferably comprises a noble metal, such as in particular gold, or a metal oxide, such as in particular zinc oxide, or a lanthanide metal oxide, on a carbon-containing support material. To perform the electrolysis process, hydrogen is supplied to the anode compartment and oxygen to the cathode compartment. To increase the selectivity of the hydrogen used, the oxygen is moistened. Using this process, alkali metal-free aqueous hydrogen peroxide solutions with a concentration of more than 1% can be obtained with a selectivity in the range 20 to 70%. Expediently, electrolysis is performed at high pressure and low temperature. The publication mentioned above is incorporated entirely into the disclosure in the present application.

It is therefore an object of the present invention to provide an improved process for preparing hydrogen peroxide by the electrochemical reaction of oxygen and hydrogen in a fuel cell. It is intended to indicate a route by means of which the concentration of the aqueous hydrogen peroxide solution obtained at the cathode can be controlled and increased.

SUMMARY OF THE INVENTION

It was found that the concentration of the aqueous hydrogen peroxide solution increases greatly with increasing thickness of the membrane. Accordingly, a process for the electrochemical preparation of hydrogen peroxide, in particular an aqueous hydrogen peroxide solution, was found comprising the cathodic reduction of oxygen and anodic oxidation of hydrogen in a fuel cell fitted with a membrane electrode unit (MEU), the membrane in which consists substantially of a sulfonic acid group-containing fluorinated polymer or copolymer, and removal of the reaction products and unreacted gases which is characterized in that a membrane with a thickness in the range greater than 50 $\mu$m to 300 $\mu$m is used.

It could not have been foreseen that the $H_2O_2$ concentration would increase with increasing thickness of the membrane. In accordance with a preferred embodiment, the membrane has a thickness in the range 100 to 250 μm, in particular 150 to 250 μm. The exceptional effect is explained in FIG. 2. The main structure of a fuel cell, which is designed as a continuous flow cell, and wherein a number of cells may be put together in a sandwich-type structure, is known per se, reference being made, for example, to the document mentioned above by S. P. Webb et al. and the documents cited therein. The cell thus consists of a symmetrical arrangement, on each of the two faces of a membrane electrode unit, of a diffuser made from a carbon-containing porous material and an end plate normally made of graphite. The elements mentioned are in close electrical contact with each other. The function of the diffuser, in addition to providing good contact, is also to ensure uniform distribution of the reactants. In accordance with a particular embodiment, the electrode end plates have parallel meandering channels or channels with some other shape, obtainable for example by cleat profiling of the end plates. These channels are expedient with regard to problem-free, i.e. without the occurrence of flooding, removal of the water and hydrogen peroxide produced in the electrochemical process and also of the water introduced by moistening the oxygen and/or hydrogen. The cation-exchanging polymer electrolyte membrane is a fluorinated ion exchange membrane of the cation type, preferably fluoropolymers or perfluoropolymers, in particular copolymers of two or more fluoromonomers or perfluoromonomers, wherein at least one of the polymers contains sulfonic acid groups. Such membranes are commercially available with different equivalent weights and different thicknesses. The document by S. P. Webb et al. mentioned at the beginning gives no indication of the thickness of the membrane. In the process for the simultaneous formation of ozone and hydrogen peroxide in the document by P. Tatapudi et al. also mentioned above, which mentions the cation exchange membrane Nafion® 117 from DuPont, a membrane with a thickness of about 180 μm is used. However, since this process is a completely different type of electrochemical process, this document does not hint at also using such a membrane in the process according to the invention.

The electrode layers are thin film-shaped layers which contain a mixture of a metal or metal oxide and carbon black, or preferably carbon black coated with a metal or metal oxide, in a fluorine-containing polymeric binder. In accordance with a preferred embodiment, each electrode layer is first applied to one face of the particular macroporous diffuser based on a carbon material and the diffuser coated in this way is then pressed onto the membrane. In accordance with a preferred embodiment, the electrode layer contains a sulfonic acid group-containing perfluorinated polymer or copolymer as binder. Instead of a sulfonic acid group-containing polymer, other perfluorinated polymers with other hydrophilic side groups obtained, for example, by graft polymerisation may also be used. The use of a hydrophilic side group-containing perfluorinated polymer or copolymer as binder in the electrode layers is advantageous as compared with the use of polytetrafluoroethylene because in this way the catalyst layer can also come into contact with the water introduced and/or formed during reaction and wetting problems are thus minimised.

The cathode preferably contains support-bonded gold or a metal oxide, such as in particular zinc oxide, wherein the support is carbon black. A combination of substantially carbon black coated with platinum and polytetrafluoroethylene, preferably a sulfonic acid group-containing perfluorinated polymer or copolymer, as binder is suitable for use as an anode for the electrochemical production of hydrogen peroxide from oxygen and hydrogen in a fuel cell.

BRIEF DESCRIPTION OF DRAWINGS

The present invention will be further understood with reference to the accompanying drawings, wherein.

DETAILED DESCRIPTION OF INVENTION

Figure 1:
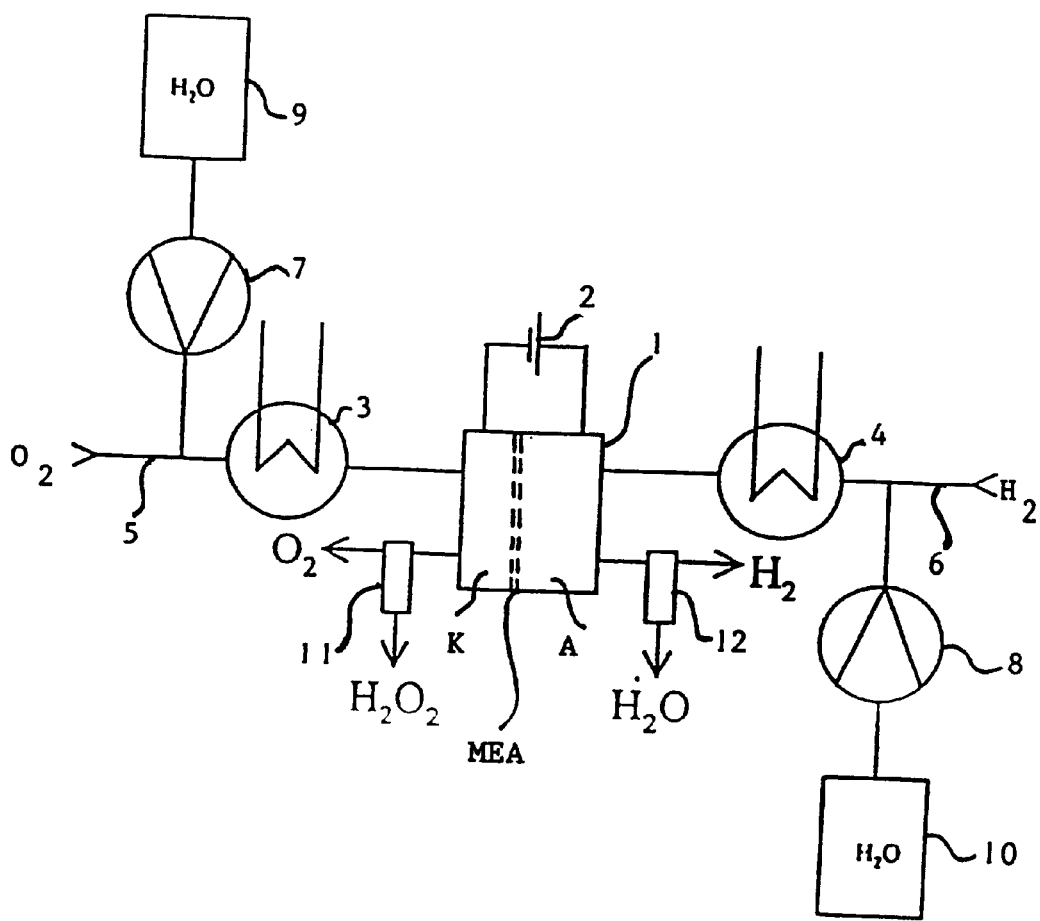
FIG. 1 shows a schematic diagram of a device for the electrochemical preparation of hydrogen peroxide.

FIG. 1 shows a schematic diagram of a device for the electrochemical preparation of an aqueous hydrogen peroxide solution from oxygen and hydrogen. The electrolysis cell (1) is a typical fuel cell, the structure of which is familiar to a person skilled in the art; K indicates the cathode compartment, A indicates the anode compartment and MEA indicates a membrane electrode assembly or unit. The cathode and anode are connected to a source of power (2). Oxygen is supplied to the cathode compartment via line (5) and hydrogen is supplied to the anode compartment via line (6). Water from a water storage tank (9) is introduced into line (5) by means of a high-pressure pump or some other device, for example a nebuliser; in heat exchanger (3), the oxygen/water vapour mixture is heated to the desired reaction temperature. In a similar manner, the hydrogen stream in line (6) can be moistened with water, wherein water is introduced from a storage tank (10) via a high-pressure pump or nebuliser or the like and the gas/water mixture is heated to the desired temperature in another heat exchanger (4). The product streams emerging from the fuel cell contain, on the cathode side, aqueous hydrogen peroxide and unreacted oxygen and, on the anode side, water and unreacted hydrogen. The gas/liquid mixtures produced can be separated in a separating device (11 or 12). The $H_2O_2$ concentration can be increased in particular by supplying water vapour at a temperature of 180° C. to the $O_2$ stream.

Figure 2:
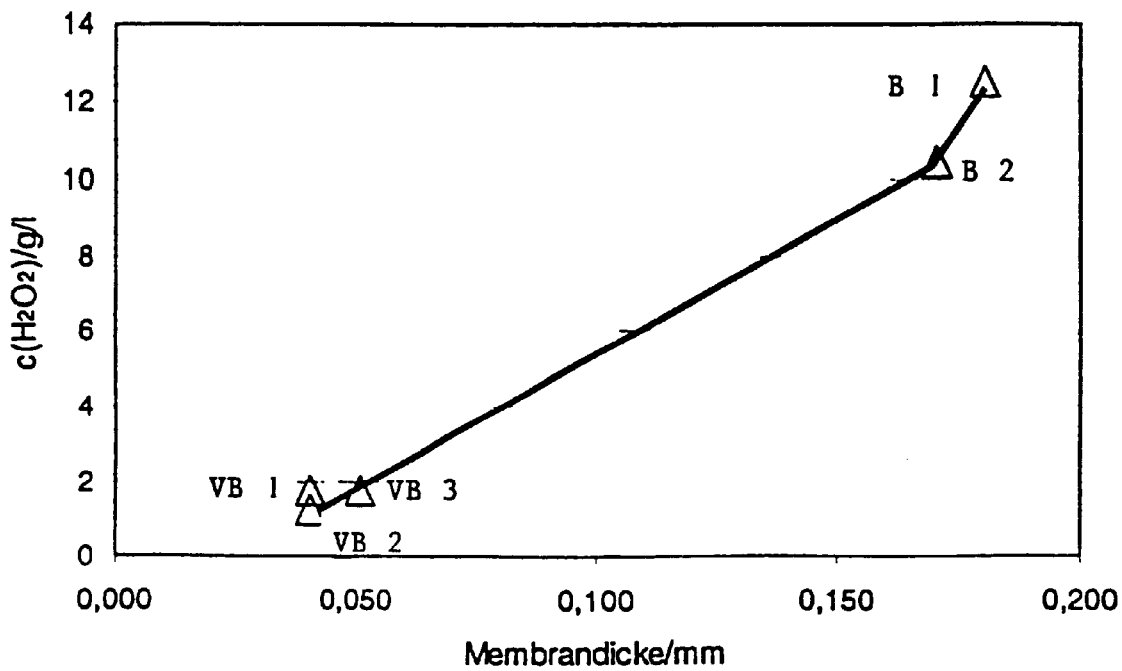
FIG. 2 is a diagram which demonstrates the variation in concentration of the aqueous hydrogen peroxide solution with the thickness of the membrane.

FIG. 2 gives the variation in concentration of hydrogen peroxide in g/l with the thickness of the membrane. Comparison examples VB1 to VB3 are trials in each of which a commercial membrane from a different manufacturer was used, the thickness of these being in the range 40 to 50 μm. In contrast, in the examples according to the invention, B1 and B2, the thickness of the membrane was 180 and 170 μm respectively. The $H_2O_2$ concentration can be increased by increasing the thickness of the membrane several times, as shown in the figure. The process according to the invention can be performed at normal or elevated temperature. The $H_2O_2$ concentration can also be increased by increasing the pressure. At a pressure of about 30 bar, the $H_2O_2$ concentration increases to well above 10 wt. %. In the comparison examples and examples the following commercially available membranes were used: VB1: Nafion® 112, VB2: Gore 40 μm, VB3: PallR1010; B1: Nafion® 117, B2: Pall-BCM4010.

By using a thick membrane in accordance with the invention in the MEU of a fuel cell, a substantially higher concentration of $H_2O_2$ can be obtained than when using a thin membrane under given operating conditions such as pressure, temperature, current density and degree of moistening.

Further variations and modifications of the foregoing will be apparent to those skilled in the art and are intended to be encompassed by the claims appended hereto.

German priority application 100 48 030.6 is relied on and incorporated herein by reference.

What is claimed is:

1. A process for the electrochemical preparation of hydrogen peroxide, comprising cathodically reducing oxygen and anodically oxidizing hydrogen in a fuel cell fitted with a membrane electrode unit (MEU), the membrane in which consists substantially of a sulfonic acid group-containing fluorinated polymer or copolymer, and removing the reaction products and unreacted gases, said membrane having a thickness of 150 $\mu$m to 300 $\mu$m.

2. The process according to claim 1, wherein the membrane has a thickness in the range 150 $\mu$m to 250 $\mu$m.

3. The process according to claim 1, wherein said MEU has a cathode which consists substantially of a metal or metal oxide, carbon black and a perfluorinated polymer or copolymer.

4. The process according to claim 1, wherein said cathode contains zinc oxide as a metal oxide and a sulfonic acid group-containing perfluorinated polymer or copolymer as binder.

5. The process according to claim 1, wherein a MEU has a anode which consists substantially of platinum, carbon black and a perfluorinated polymer or copolymer.

6. The process according to claim 1, wherein the fuel cell is operated with a current density in the range 50 to 500 mA/cm$^2$.

7. The process according to claim 1, wherein the oxygen and/or hydrogen is moistened with water vapour prior to entering the fuel cell.

8. The process according to claim 1, wherein the fuel cell is operated at a pressure in the range 2 to 40 bar.

9. The process according to claim 8, wherein the pressure is 2 to 15 bar.

10. A process for the electrochemical preparation of an aqueous hydrogen peroxide solution, comprising carrying out a cathodic reduction of oxygen and an anodic oxidation of hydrogen in a fuel cell fitted with a membrane electrode unit (MEU);

said MEU having a cathode which consists substantially of a metal or metal oxide, carbon black and a perfluorinated polymer or copolymer, and an anode which consists substantially of platinum, carbon black and a perfluorinated polymer or copolymer, said MEU containing a membrane which consists substantially of a sulfonic acid group-containing fluorinated polymer or copolymer, in the presence of water and removing the reaction products and unreacted gases, wherein said membrane has a thickness of 150 $\mu$m to 300 $\mu$m.

* * * * *